United States Patent Office 2,855,946
Patented Oct. 14, 1958

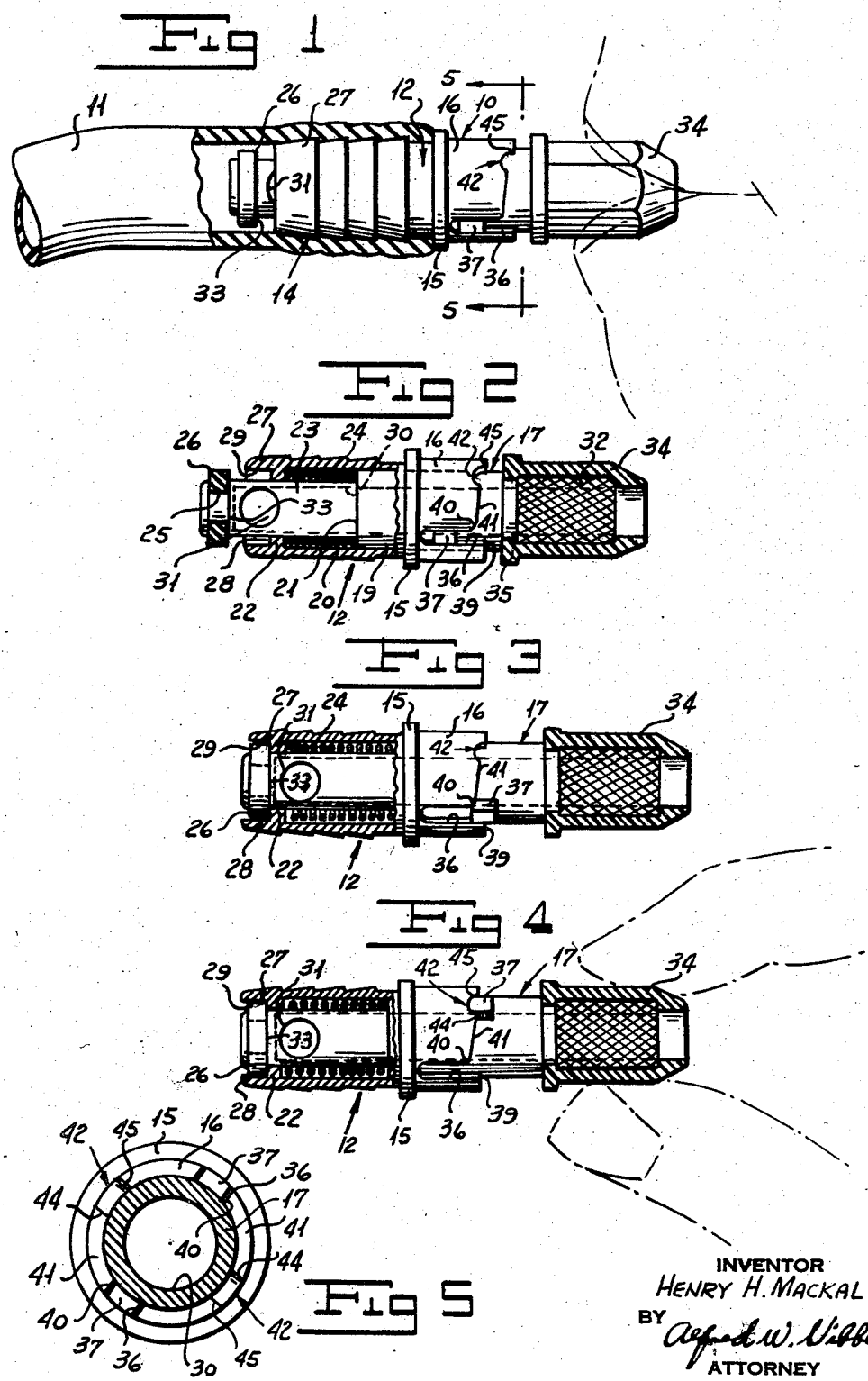

2,855,946

QUICKLY DISASSEMBLED INFLATION AND RELIEF VALVE

Henry H. Mackal, Paramus, N. J.

Application December 30, 1955, Serial No. 556,488

5 Claims. (Cl. 137—223)

This invention relates to a valve, and more particularly relates to a valve which may be employed for the inflation of hollow articles such as life vests, life rafts, etc.

A satisfactory inflation valve for the type of service indicated must be strong, resistant to mechanical shock, positive in action, and simple to operate. The valve must not leak when it is in fully closed position, since life depends upon its positive sealing. It is particularly desirable that the valve be economical to manufacture and to assemble. The valve may also be used to advantage for use where an opening must be selectively sealed against the passage of other fluids such as liquids.

The valve of the invention has a first, outer valve element with a longitudinally extending passage therethrough, and a second, inner valve element mounted in the passage for reciprocation longitudinally therein between an inner position in which the valve is open and an outer position in which the valve is closed. Preferably the inner valve element is provided with a manipulating stem extending outwardly beyond the outer end of the outer valve element, the stem being hollow and serving as a conduit for the gas which is fed into or exhausted from the inflatable article. Preferably, although not necessarily, the valve is provided with a resilient means such as a spring which constantly urges the inner valve element toward valve-closed position.

The valve is provided with a valve orifice comprising a valve seat disposed transversely to the length of the passage on one of the valve elements, the seat preferably being located on the outer valve element and being in the form of an annular surface surrounding and transverse to the passage through such element. A deformable closure member on the other valve element cooperates with the valve seat. Preferably the deformable closure member is in the form of a transversely extending rubber-like member adapted to engage the annular seat surface with face-to-face contact.

The resilient means preferably employed with the valve and constantly urging the inner valve element toward valve-closed position is adequate to provide a seal. To insure that the valve will remain stable in the valve-closed position, however, the valve is provided with a locking means which forces the deformable closure member and the valve seat still more strongly together, the resulting additional deformation of the deformable closure member serving not only to insure a tight sealing of the valve orifice but also stably selectively to retain the valve locking means in locked position.

The invention has among its objects the provision of an improved valve of the inflation type characterized by its positiveness of sealing, its ease of manipulation, and its simplicity of manufacture and assembly. A further object of the invention resides in the provision of a valve of the type indicated having means for positively locking the movable valve element in the valve-closed position, the locking means of the valve subjecting the sealing surfaces thereof to increased sealing pressure against each other.

Yet another object of the invention lies in the provision of a valve of the type described wherein the movable element reciprocates relative to the fixed element thereof, the two valve elements have cooperating sealing surfaces at least one of which is deformable, and the locking means drawing the sealing surfaces against each other more forcibly than in the normal, unlocked closed position of the valve.

Still another object of the invention, in a preferred embodiment thereof, lies in the provision of an improved valve orifice in an inflation valve of the type described, the portion of the orifice on one valve element having a valve seat including an end wall and a surrounding side wall, the other valve element having a deformable closure member which, when relaxed, freely slides within the side wall of the seat as it approaches the end wall of the seat, the endwise deformation of the deformable closure member upon locking of the valve serving additionally to expand the closure member radially into sealing engagement with the side wall of the seat.

Other objects of the invention are the provision of valve locking means such that the position of the valve: whether it is open, closed but not locked, and closed and locked, may easily be determined visually, the provision of a valve of the type indicated which requires no tools for its assembly or disassembly, and which allows the deformable seat to be easily replaced or cleaned by use of the fingers alone, and the provision of a valve of the type indicated wherein the locking device is simple, strong, and adds little if any weight to the valve.

The above and further objects of the invention relating to economies of use and manufacture will more particularly appear in the following description of a preferred embodiment thereof as shown in the accompanying drawing, in which:

Fig. 1 is a view in side elevation of an inflation valve in accordance with the invention, the valve being shown mounted in a fragment of a tube adapted to be attached to an inflatable article, a portion of the tube at the location of the valve being broken away.

Fig. 2 shows the valve per se, the view being primarily in side elevation but portions of the outer valve element and of the inflating mouthpiece thereof being shown in axial section, the valve being shown in open position.

Fig. 3 is a view similar to Fig. 2, but with the inner, movable valve element in the outer, closed position in which it is normally urged by the spring acting between valve elements.

Fig. 4 is a view similar to Figs. 2 and 3, but with the inner, movable valve element in its outermost, fully locked position.

Fig. 5 is a view in transverse section through the inflation stem of the valve, the section being taken along the line 5—5 of Fig. 1.

The illustrated embodiment of the valve of the invention, designated generally by the reference character 10, is shown in Fig. 1 as being mounted in the end of a flexible tube 11 which is adapted to be connected as a permanent part of an inflatable article such as life vest, life raft, etc. The valve has an outer body, generally designated 12, which has a rear, inner (as regards the contents of the inflated article) end, having a series of similar frusto-conical zones on its outer surface so as to seal with the inner surface of tube 11. A shoulder 15 on the body 12 forms a stop for the end of tube 11, beyond the shoulder the body 12 having an outwardly extending generally cylindrical portion 16, which incorporates portions of the valve locking means, to be described.

Body 12 has a central axial bore 20 therein, within which the inner valve 17 is mounted for axial reciprocation. Member 17 is guided by sliding engagement between its larger-diametered portion 19 and the wall of bore 20 in member 12, and by sliding engagement between the inner surface of the radially inwardly projecting flange 22 on body 20 and the outer surface of an elongated smaller-diametered cylindrical portion 23 of valve element 17. A coil compression spring 24, surrounding portion 23 of the movable valve element, and acting between the forward edge of flange 22 and shoulder 21 at the junction between portions 19 and 23 of the inner valve element, constantly urges such inner valve element into valve-closed position, that is, toward the right in Fig. 2.

The movable valve element 17 is provided with an annular circumferential groove 25 adjacent its rear inner end, such groove serving to retain on the movable valve element a rubber or rubber-like annular washer member 26, which forms one part of the valve orifice. The other part of the valve orifice is made up of the inner rear wall 28 of flange 22, which is in the form of an annulus disposed transversely to the passage 20 through the outer valve element and surrounding such passage. When the inner valve element 17 is in valve-closed position, as shown in Figs. 3 and 4, the forward edge surface 33 of member 26 and surface 28 of flange 22 are brought in face-to-face contact, whereby to seal the passage through the valve.

Valve element 17 is provided with a manipulating stem 32 which extends outwardly beyond the forward end 16 of the outer valve element 12. Valve element 17 has a central bore 30 which extends from the outer end of stem 32 inwardly toward a position adjacent washer 26, bore 30 communicating with the valve orifice through cross bores 31 through the side wall of portion 23. The embodiment of the valve shown is adapted for mouth inflation, so that the outer end of stem 32 is provided with a mouthpiece 34, made of rubber or the like, which is retained by a flange which snaps into a shallow groove 35 on the stem as shown.

Preferably the exterior of stem 32 is knurled, as shown, so as to afford non-slipping contact with the mouthpiece 34, since in preferred embodiments of the valve torque is required to be exerted on the valve body 12 and the movable valve element 17 to rotate them relatively to each other from the unlocked position of Fig. 3 to the position of Fig. 4, wherein it is locked by means to be described.

When the inflatable article equipped with the valve of the invention is to be inflated, the inner valve element 17 is pressed inwardly, as indicated in Figs. 1 and 2, against the action of coil spring 24, and air is supplied to the article by blowing through the outer end of stem 32. During periods of rest of the operator, the stem 32 of the movable valve element may be released, so that the coil spring 24 then thrusts the movable valve element into the position of Fig. 3 to close the valve orifice. Coil spring 24 is preferably made to have a relatively light compression, so that the valve element 17 may be readily pushed into valve-open position by the operator's lips. Consequently, although the valve element in the position of Fig. 3 retains the contents of the inflated article securely if the valve is not jarred or if the movable element thereof is not pushed inwardly, it does not insure that the valve remains closed at all times when desired, particularly since the valve element 17 in the position of Fig. 3 may readily be thrust inwardly into valve-open position as by accidental contact of its inflating stem 32 with some other object.

Accordingly, the valve of the invention is provided with a valve-locking means which not only insures that the movable valve element cannot be accidently thrust inwardly to open the valve orifice, but which subjects the contacting surfaces 33 and 28 of the valve orifice to markedly increased pressure, thereby to deform the member 26 to insure a very tight seal completely around the valve orifice, sufficient to withstand high fluid pressures without leakage.

Portion 16 of the outer valve element 12 is provided with two diametrically opposed slots 36 which extend parallel to the axis of such element. In the embodiment shown slots 36 extend inwardly to approximately the shoulder 15 on valve element 12. Reciprocable in slots 36 are two radial pins 37 projecting outwardly from portion 19 of the inner valve element 17. Pins 37 are so located longitudinally of valve element 17 that when they lie at the bottom of the slots 36 surfaces 28 and 33 of the valve orifice are markedly separated and cross-bores 31 in the inner valve element lie substantially wholly inwardly beyond surface 28 of the valve seat. As shown, corresponding corners 39 of each of slots 36 are sharp, and lie on the main outer peripheral edge surface of the end of portion 16 of the outer valve element. The other, confronting corner 40 of each of slots 36 is rounded and lies substantially rearwardly of the corner 39. Each corner 40 forms in effect, the lower end of a corresponding helical cam surface 41 which extends substantially 90° about the axis of valve element 12, as more clearly shown in Fig. 5. At the other end of cam surface 41, which is in effect the high end of the cam, there is provided a curved notch 42 having a lower corner 44 adjacent cam surface 41 and a higher end corner 45 which lies at the same level as the main peripheral edge surface of portion 16. The valve parts are preferably made of such size relative to each other that corner 45 constitutes a positive stop for the rotation of valve element 17.

When valve element 17 is in the position of Fig. 3, into which it is pressed by the coil compression spring 24, it is held from rotation with respect to the outer valve element, since the inner portions of the pins 37 are still located between the corners 39 and 40 of the slots 36. Consequently, during manipulation of the valve between the positions of Figs. 2 and 3, the inner valve element 17 is prevented from rotation with respect to the outer valve element. When it is desired to lock the inner valve element in fully closed position, and more forcibly to seal the valve orifice, the inner valve element is rotated clockwise, as it is shown in Fig. 5, relative to the outer valve element, thereby to cause pins 37 to ride up over the respective corners 40 of the slots 36 and thence outwardly along the cam surfaces 41. This causes the inner valve element 17 to be pulled outwardly of the outer valve element against the action of the rubber-like washer 26 which is increasingly deformed as valve element 17 approaches valve-locked position. When the inner valve element has been turned approximately 90°, its pins 37 drop into notches 42, so that the inner valve element is stably held in locked position. The higher corners 45 of notches 33 prevent further clockwise turning of the inner valve element. The lower corners 44 of such notches, however, are of such height that they allow unlocking and release of the inner valve element when it is forcibly and deliberately turned counter-clockwise to cause the pins to ride up out of the notches and then down the inclined cam surfaces.

The preferred embodiment of valve shown is particularly easily and quickly manipulated, and is economical to manufacture and assemble. Further, it is sturdy and light, and allows the position of its movable valve to be readily visually detected. Since one hand of the operator grasps the portion of tube 11 overlying valve body 12 and the other grasps mouthpiece 34, his hands need not contact metal when manipulating the valve, which is a distinct advantage in cold weather. Manipulation of the valve to change the position of its movable element from fully open position to closed and locked position, or vice versa, may be effected in a fraction of a second. Assembly of the valve consists simply of telescoping the spring 24 over portion 23 of valve element 17, inserting valve element 17 in body 12, and then assembling the deformable member 26 in its seat on the inner end of element 17. The position of valve element 17, whether it is open, closed but not locked, or closed and locked can readily be determined visually by observing the position of pins 37 relative to slots 36, ramps 41, and notches 42. In the darkness, the relative position of pins 37 and slots 36, ramps 41, and notches 42 can easily be detected by one's fingers. The locking device is made in part by removing stock from the valve body to form slots 36, ramps 41, and notches 42, so that, in the preferred embodiment shown, its net effect is to lighten the valve rather than to add to its weight.

Because of the marked deformation of member 26 which takes place when the inner valve elment is in its terminal, locked position, sealing engagement between the edge 33 of member 26 and the transverse annular surface 28 of flange 22 is insured. Preferably, as shown, the valve orifice is hooded and protected somewhat by the provision on the outer valve element of hood 27 which projects rearwardly of flange 22, thereby protecting the valve seat surface 28 against the direct engagement with obstructions and foreign matter which might injure it. Portion 27 has an inner cylindrical side wall 29 which freely slidingly receives the member 26 when the inner valve element travels from the position of Fig. 2 to that of Fig. 3. In the position of Fig. 3 portion 27 likewise protects the deformable member 26.

Preferably, cylindrical side wall surface 29 of portion 27 has an inner diameter which exceeds the relaxed diameter of the periphery of member 26, when the latter is mounted on the inner valve element, by a few thousandths of an inch. Thus member 26 freely slides within the surface 29 when the inner valve element is moved between the positions of Figs. 2 and 3. When, however, the inner valve element is forcibly pulled still further to the right by the described locking means, the resulting deformation of member 26 causes it to be compressed longitudinally and to grow radially, as shown in Fig. 4, so that its periphery then has sealing engagement with the cylindrical inner surface 29 of portion 27, thereby still further insuring complete sealing closure of the valve orifice. Further, such radial compression of deformable member 26 insures complete sealing between the wall of its central bore and the surface of groove 25 on element 17 on which such member is mounted.

Whereas for purposes of illustration I have shown and described a preferred embodiment of the valve of the invention, it will be understood that the valve is capable of considerable variation as to details within the scope of the invention. The invention is, therefore, to be defined by the claims appended hereto.

I claim as new the following:

1. An inflation valve having a first, outer valve, element with a longitudinally extending passage therethrough, a second, inner valve element mounted in the passage to reciprocate longitudinally thereof between an inner position in which the valve is open and an outer position in which the valve is closed, all parts of the inner valve element which are adapted to lie within the outer valve element, other than the deformable closure member thereon, being of smaller diameter than the longitudinally extending passage through the outer valve element, a valve orifice comprising an annular valve seat on the outer valve element disposed about the passage and transversely to the length of the passage, and a deformable closure member on the inner valve element and cooperating with the valve seat, the deformable closure member being in the form of an annular rubber-like member disposed with its radially inner edge in an annular recess at the end of the inner valve element located inwardly of the valve seat, the deformable closure member having face-to-face contact with the valve seat when the valve is closed, and means selectively to lock the inner valve elment in valve-closed position comprising an inclined cam surface on the outer edge of the outer valve element, a cam follower on the inner valve element coperating therewith to thrust the closure member more forcibly outwardly against the valve seat as the elements are turned relative to each other, means at one end of the cam surface selectively stably to retain the cam follower to hold the inner valve element in valve-closed position, and a generally axially extending cam follower-receiving slot in the outer valve element at the other end of the cam surface providing for movement of the inner valve element between opened and closed positions, said slot being open at the outer edge of the outer valve element, the closure member being removable from the inner valve element by being pulled out of the recess, the inner valve element being then freely removable from the outer valve element in an axially outward direction.

2. An inflation valve as defined in claim 1, wherein the outer end of the slot lies adjacent the axially inner end of the cam surface.

3. An inflation valve as defined in claim 2, wherein the side of the slot further from the cam surface extends markedly axially outwardly of the side of the slot nearer the axially inner end of the cam surface.

4. An inflation valve as defined in claim 1, wherein the inner valve element has a manipulating stem projecting beyond the outer end of the passage in the outer element, and the inner valve element has a longitudinal passage therein extending from a zone close to and outwardly of the deformable closure member to the outer end of the manipulating stem thereof.

5. An inflation valve as defined in claim 1, comprising a helical coil compression spring disposed about the inner valve element and acting between the inner and outer valve elements constantly to urge the inner valve element toward closed position.

References Cited in the file of this patent

UNITED STATES PATENTS

| | | |
|---|---|---|
| 117,908 | Meharg | Aug. 8, 1871 |
| 218,698 | Beardsley | Aug. 19, 1879 |
| 1,299,480 | Kirby | Apr. 8, 1919 |
| 1,300,611 | Henemier | Apr. 15, 1919 |
| 1,558,245 | Davis | Oct. 20, 1925 |
| 1,600,481 | Nadig | Sept. 21, 1926 |
| 1,690,183 | Stoughton | Nov. 6, 1928 |
| 1,729,914 | Tryhorn | Oct. 1, 1929 |
| 2,690,895 | Barcus | Oct. 5, 1954 |
| 2,705,123 | Hieger | Mar. 29, 1955 |
| 2,764,385 | Sieling | Sept. 25, 1956 |

FOREIGN PATENTS

| | | |
|---|---|---|
| 324,768 | Great Britain | Feb. 6, 1930 |
| 338,207 | Great Britain | Nov. 17, 1930 |